US011122910B2

(12) United States Patent
Chunglo

(10) Patent No.: US 11,122,910 B2
(45) Date of Patent: Sep. 21, 2021

(54) MULTI-LAYERED CONVOLUTED FOAM LAYER

(71) Applicant: DREAMWELL, LTD., Las Vegas, NV (US)

(72) Inventor: Christopher F. Chunglo, Marietta, GA (US)

(73) Assignee: DREAMWELL, LTD., Doraville, GA (US)

( * ) Notice: Subject to any disclaimer, the term of this patent is extended or adjusted under 35 U.S.C. 154(b) by 668 days.

(21) Appl. No.: 13/657,130

(22) Filed: Oct. 22, 2012

(65) Prior Publication Data
US 2014/0109320 A1 Apr. 24, 2014

(51) Int. Cl.
*A47C 27/14* (2006.01)
*B32B 5/32* (2006.01)
(Continued)

(52) U.S. Cl.
CPC .......... *A47C 27/146* (2013.01); *A47C 27/148* (2013.01); *A47C 27/15* (2013.01); *B32B 3/30* (2013.01); *B32B 5/32* (2013.01); *B32B 38/06* (2013.01); *B32B 38/0004* (2013.01); *B32B 2250/02* (2013.01); *B32B 2250/22* (2013.01); *B32B 2266/025* (2013.01); *B32B 2266/0228* (2013.01); *B32B 2266/0278* (2013.01); *B32B 2305/022* (2013.01); *B32B 2307/536* (2013.01);
(Continued)

(58) Field of Classification Search
CPC ..... A47C 27/15; A47C 27/056; A47C 27/148; A47C 27/144; A47C 27/001; A47C 31/105; A47C 27/14; A47C 27/142; A47C 27/146; B32B 3/30; B32B 5/32; B32B 2250/02; B32B 2250/22; B32B 2266/0228; B32B 2266/025; B32B 2266/0278
USPC .................... 5/691, 740, 728, 722, 727, 373
See application file for complete search history.

(56) References Cited

U.S. PATENT DOCUMENTS 4,603,445 A * 8/1986 Spann .................. A47C 27/146
428/131
4,847,933 A * 7/1989 Bedford ............... A61G 5/1043
5/652.2
(Continued)

FOREIGN PATENT DOCUMENTS

FR 2800592 A3 * 5/2001 ........... A47C 27/144
JP 2000166707 A * 6/2000 ........... A47C 27/146
WO 2014066078 A2 5/2014

OTHER PUBLICATIONS

JP-2000166707-A English Translation (Year: 2000).*
(Continued)

*Primary Examiner* — Eric J Kurilla
*Assistant Examiner* — Amanda L Bailey
(74) *Attorney, Agent, or Firm* — Cantor Colburn LLP

(57) ABSTRACT

Convoluted foam layers for mattresses, cushions and the like include at least one convoluted surface including at least one convolution that is structurally heterogeneous. The convoluted foam layer is formed of at least two foam layers fixedly attached to one another, wherein the foam layers are of different materials and/or have different properties. Also disclosed are processes for forming the convoluted foam layer and convoluted foam layers having multiple zones of a convoluted surface pattern that includes at least one convolution that is structurally heterogeneous.

6 Claims, 5 Drawing Sheets

(51) Int. Cl.
*A47C 27/15* (2006.01)
*B32B 3/30* (2006.01)
*B32B 38/06* (2006.01)
*B32B 38/00* (2006.01)

(52) U.S. Cl.
CPC ..... *B32B 2307/72* (2013.01); *B32B 2309/105* (2013.01); *B32B 2601/00* (2013.01); *Y10T 156/1043* (2015.01); *Y10T 428/24496* (2015.01)

(56) References Cited

U.S. PATENT DOCUMENTS

| | | | | |
|---|---|---|---|---|
| 5,138,730 | A * | 8/1992 | Masuda | A47C 27/144 |
| | | | | 5/693 |
| 5,163,194 | A * | 11/1992 | Dixon | A47G 9/1081 |
| | | | | 5/636 |
| 5,230,110 | A * | 7/1993 | Rose | 5/701 |
| 5,317,768 | A | 6/1994 | Klancnik | |
| 5,477,573 | A * | 12/1995 | Bonaddio | B26D 3/281 |
| | | | | 264/284 |
| 5,534,208 | A * | 7/1996 | Barr | A61G 7/05707 |
| | | | | 264/160 |
| 5,604,021 | A * | 2/1997 | Wagner | 5/736 |
| 5,669,094 | A * | 9/1997 | Swanson | A47C 27/14 |
| | | | | 5/740 |
| D400,385 | S * | 11/1998 | Hudson | D6/596 |
| 6,041,459 | A | 3/2000 | Nunez et al. | |
| 6,372,076 | B1 | 4/2002 | Ogle | |
| 6,485,822 | B1 | 11/2002 | Osiecki et al. | |
| 6,701,557 | B2 | 3/2004 | Barman | |
| 6,719,742 | B1 | 4/2004 | McCormack et al. | |
| 7,155,765 | B2 * | 1/2007 | Fogg | A47C 27/148 |
| | | | | 5/691 |
| 7,444,702 | B2 * | 11/2008 | Fogg | A47C 27/148 |
| | | | | 5/691 |
| 7,520,012 | B2 * | 4/2009 | Robins | 5/740 |
| 7,954,189 | B2 | 6/2011 | Rawls-Meehan | |
| 8,209,804 | B2 | 7/2012 | Apperson et al. | |
| 2003/0150061 | A1 * | 8/2003 | Farley | A47C 27/146 |
| | | | | 5/736 |
| 2005/0084667 | A1 * | 4/2005 | Landvik | A47C 27/15 |
| | | | | 428/316.6 |
| 2006/0273650 | A1 * | 12/2006 | Embach | A47C 7/18 |
| | | | | 297/452.27 |
| 2007/0044245 | A1 | 3/2007 | Bryant et al. | |
| 2011/0067183 | A1 * | 3/2011 | Hawkins | A47C 27/144 |
| | | | | 5/740 |
| 2011/0154576 | A1 * | 6/2011 | Warren | A47C 27/144 |
| | | | | 5/740 |
| 2011/0256369 | A1 * | 10/2011 | Switzer | A47C 27/001 |
| | | | | 428/215 |
| 2012/0189809 | A1 * | 7/2012 | Henson | B32B 5/18 |
| | | | | 428/141 |
| 2014/0109320 | A1 * | 4/2014 | Chunglo | A47C 27/15 |
| | | | | 5/740 |

OTHER PUBLICATIONS

Notification Concerning Transmittal of International Preliminary Report on Patentability (Chaper I of the Patent Cooperation Treaty), issued in International Application No. PCT/US2013/064775, dated May 7, 2015: 7 pages.

International Search Report and Written Opinion issued in International Patent Application No. PCT/US2013/64775, dated Jun. 10, 2014; 8 pages.

\* cited by examiner

MULTI-LAYERED CONVOLUTED FOAM LAYER

BACKGROUND

The present disclosure generally relates to a multi-layered convoluted foam layer, and more particularly, to mattresses and/or cushions including the multi-layered convoluted foam layer, wherein at least one convolute is formed of multiple layers.

Convoluted foam layers have been employed in mattresses and cushions for some time to provide improved support and/or comfort. Convoluted foam layers typically include a flat bottom surface that is disposed onto a support surface such as a mattress and a convoluted top surface. The convolutions in the top surface may be of any size and shape. Similarly, the convolutions within the layer can be uniform such as in the case of a regularly spaced egg crate-type convoluted foam surface often used in packaging materials or may be non-uniform across the surface so as to provide multiple zones of different convolute structures, e.g., egg crate-type, wave type, spheres, and the like. The various heights and depths provided by the convoluted foam layer are believed to reduce pressure points and provide better conformance to the human body than a traditional flat foam cushion. Depending on the desired application, the convoluted foam layer may be disposed with the varying topography facing upwards to the end user or facing downwards towards ground.

Current convoluted foam layers are structurally homogeneous and provide minimal differences in feel between the convoluted foam layer and flat foam layers when in use. By use of the term "structurally homogenous" it is meant that the convolute itself is formed of a single material having defined properties. Relative to flat foam layers, the manufacturer bears the burden of the additional expense associated with forming the convoluted surface to a foam layer. Moreover, since the typical process for forming the convoluted surface includes cutting a single unitary foam piece to form two convoluted foam layers having mirror images of one another, the changes in feel across the different zones, where provided, is minimal and represents a marginal improvement relative to a convoluted foam layer having a uniform convolution pattern across the entire surface.

BRIEF SUMMARY

The present disclosure is directed to convoluted foam layers for mattresses and cushions. Also, disclosed are processes for forming the convoluted foam layers. In one embodiment, a convoluted foam layer comprises a multi-layer foam laminate comprising a first layer and at least one additional layer fixedly attached to the first layer; wherein the multi-layer foam laminate comprises a convoluted foam surface comprising a plurality of convolutions, wherein at least one of the convolutions has a depth extending from a peak to a valley into the first layer and the at least one additional layer.

In one embodiment, a mattress comprises at least one convoluted foam layer having a convoluted surface comprising a plurality of convolutions, wherein at least one of the convolutions is structurally heterogeneous.

In one embodiment, a process for manufacturing convoluted foam comprises fixedly attaching at least two foam layers to each other to define a foam laminate, wherein the at least two foam layers are of different materials and/or have different properties; and forming a convoluted surface in at least one surface of the foam laminate, wherein the convoluted surface comprising a plurality of convolutions formed of the at least two foam layers.

In one embodiment, a mattress comprises at least one convoluted foam layer comprising a plurality of zones defined by a convoluted surface pattern, wherein the convoluted surface pattern comprises at least one convolution that is structurally heterogeneous.

The disclosure may be understood more readily by reference to the following detailed description of the various features of the disclosure and the examples included therein.

BRIEF DESCRIPTION OF THE SEVERAL VIEWS OF THE DRAWINGS

Referring now to the figures wherein the like elements are numbered alike.

DETAILED DESCRIPTION

Disclosed herein is a convoluted foam layer for use in mattresses, cushions, or the like. The convoluted foam layer is generally formed of multiple layers and includes at least one convoluted top surface, wherein the depth of at least one of the convolutions extends into at least two layers, wherein the at least two layers are of different materials and/or properties. As an example, the multiple layers that define the convoluted foam layer can include different hardness properties such that the convolutions are configured to provide a gradient density from the peak of the convolution to the valley of the convolution. Similarly, the convolutions may be formed of different materials, e.g., viscoelastic foam and latex foam. Advantageously, since the convoluted foam layer includes one or more convolutes that are structurally heterogeneous as opposed to the prior art convolutes having a homogeneous structure, the difference in feel when compared to a structurally homogenous convoluted foam layer or a flat foam layer can be markedly different depending on the choice of materials and/or the differences in properties, thereby providing the manufacturer with additional tools to enhance as well as tailor the feel and comfort of the mattress or cushion to the end user. Moreover, the convoluted foam layer can be manufactured to provide multiple non-uniform zones that significantly differ in feel when compared to prior art zoned convoluted foam layers having convolutions that are structurally homogeneous.

Figure 1:
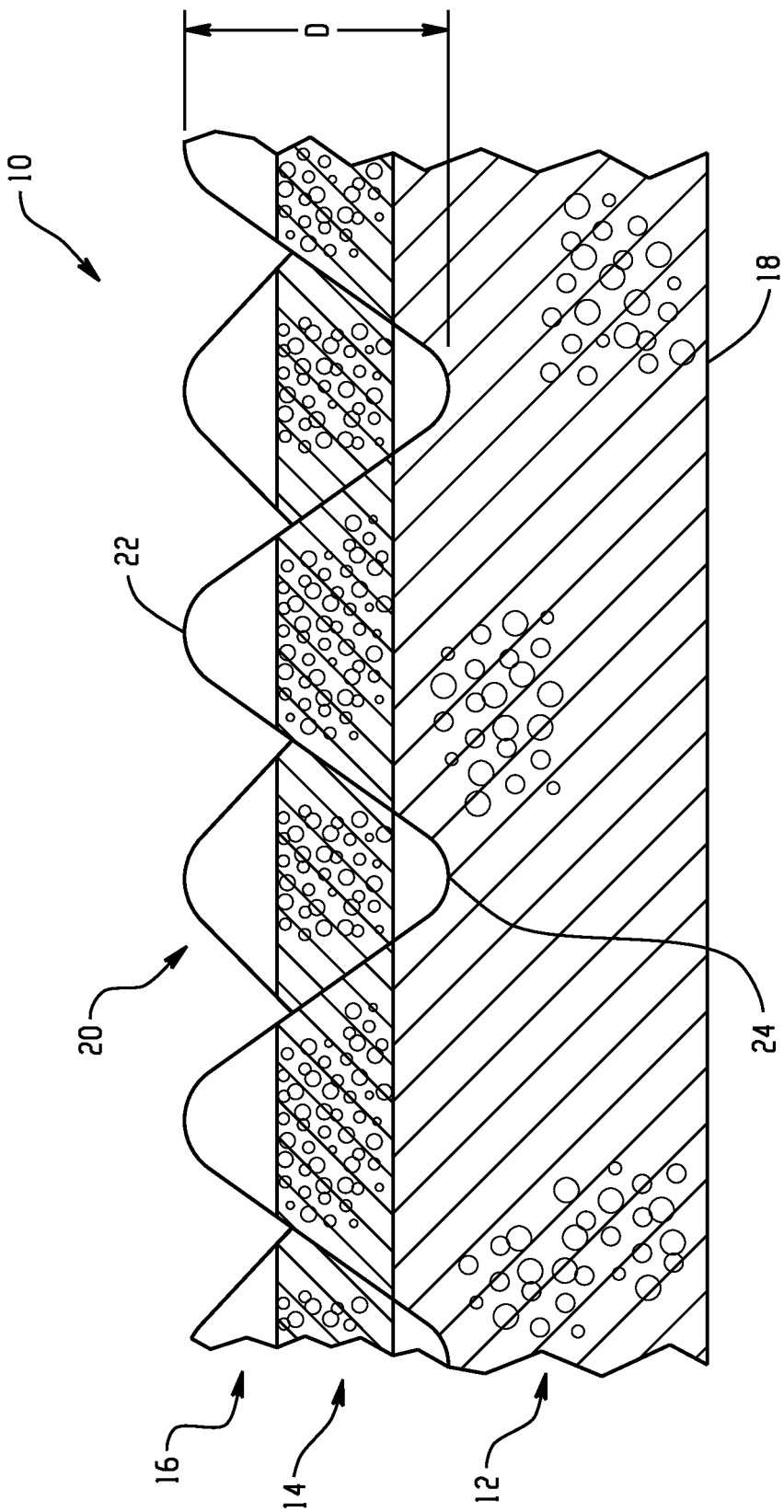
FIG. 1 depicts an a cross sectional view of a convoluted foam layer in accordance with the present disclosure.

Referring now to FIG. 1, there is depicted a cross sectional view of an exemplary convoluted foam layer generally designated by reference numeral 10 in accordance with the present disclosure. As shown, the convoluted foam layer 10 includes convolutions formed of at least two different layers, which in this exemplary embodiment include three layers 12, 14, and 16 that are fixedly attached to one another. The particular numbers of layers that are fixedly attached to one another to define the convoluted foam layer 10 are not intended to be limited. The different layers can be of different materials and/or have different properties. The degree of the differences in properties provided by the same or different materials can be tailored to provide specific feels and tactile responses. The individual layers defining the convoluted foam layer can be fixedly attached to one another by any means including, but not limited to, application of hot or cold adhesives, and the like The convoluted foam layer 10 can include a planar bottom surface 18 and has at least one convoluted surface 20, which as shown depicts an egg crate-type convoluted surface. In other embodiments, it may be desired to have a convoluted foam layer having convoluted surfaces at both the top and bottom surfaces, wherein at least one of the convoluted surfaces includes convolutions formed of multiple layers. Still further, as will be discussed below, the particular convoluted surface is not intended to be limited and may include multiple shapes and zones.

The convoluted surface 20 includes a plurality of peaks 22 and valleys 24 defined by a depth (D). As shown, the depth of the valley from the peak extends into three layers 12, 14, and 16. As such, each convolute is structurally heterogeneous. The properties and/or the materials of the individual layers 12, 14, and 16 that define the convoluted foam layer 10 can be selected and tailored to provide a wide variety of tactile responses.

Suitable foams for the different layers include, but are not limited to, polyurethane foams, latex foams including natural, blended and synthetic latex foams; polystyrene foams, polyethylene foams, polypropylene foam, polyether-polyurethane foams, and the like. Likewise, the foam can be selected to be viscoelastic or non-viscoelastic foams. Some viscoelastic materials are also temperature sensitive, thereby also enabling the convoluted foam layer to change shape based in part upon the temperature of the supported part. Any of these foams may be open celled or closed cell or a hybrid structure of open cell and closed cell. Likewise, the foams can be reticulated or partially reticulated or non-reticulated. Still further, the foams may be gel infused in some embodiments. The term reticulation generally refers to removal of cell membranes to create an open cell structure that is open to air and moisture flow. The different layers can be formed of the same material configured with different properties or different materials.

The various foams suitable for use in the convoluted foam layer 10 may be produced according to methods known to persons ordinarily skilled in the art. For example, polyurethane foams are typically prepared by reacting a polyol with a polyisocyanate in the presence of a catalyst, a blowing agent, one or more foam stabilizers or surfactants and other foaming aids. The gas generated during polymerization causes foaming of the reaction mixture to form a cellular or foam structure. Latex foams are typically manufactured by the well known Dunlap or Talalay processes.

The different properties for each layer defining the convoluted foam may include, but are not limited to, density, hardness, thickness, support factor, flex fatigue, air flow, various combinations thereof, and the like. Density is a measurement of the mass per unit volume and is commonly expressed in pounds per cubic foot. By way of example, the density of the each layer within the convoluted foam layer can vary. In some embodiments, the density decreases from the lower most convolute individual layer to the uppermost layer. In other embodiments, the density decreases from peak to valley. In still other embodiments, the convolute foam layer is formed of three or more individual layers, wherein the density is random and is not characterized as a gradient. The hardness properties of foam are also referred to as the indention load deflection (ILD) or indention force deflection (IFD) and is measured in accordance with ASTM D-3574. Like the density property, the hardness properties can be varied in a similar manner. Moreover, combinations of properties may be varied for each individual layer defining the convolution. The individual layers defining the convolution can also be of the same thickness or may have different thicknesses as may be desired to provide different tactile responses.

By way of example, the convoluted foam layer can be formed of the same polyurethane foam but have different densities or hardness for each layer, thereby providing a gradient density or gradient hardness within the convolution. In another example, the convoluted foam layer can include a standard polyurethane foam layer and a viscoelastic layer so that the convolutions include a structurally heterogeneous layer of standard polyurethane and viscoelastic foam. The various combinations are practically limitless and provide the manufacturer with opportunities to tailor the tactile response to the end user.

The hardness of the layers can have an indention load deflection (ILD) of 7 to 16 pounds force for viscoelastic foams and an ILD of 7 to 45 pounds force for non-viscoelastic foams. ILD can be measured in accordance with ASTM D 3575.

The density of the layers can generally range from about 1 to 2.5 pounds per cubic foot for non viscoelastic foams and 1.5 to 6 pounds per cubic foot for viscoelastic foams For mattress applications, the thickness of the convoluted foam layer can generally range from about 0.5 inch to about the thickness to about the thickness of the mattress. The depth of the convolution as measured from a peak to a valley can will generally depend in the thickness of the convoluted foam layer The convoluted foam layer can take numerous forms as may be desired for different applications including, without limitation, for use in mattresses, mattress toppers, sleeper sofas, futons, overlays, head pillows, neck pillows, seat cushions including the base and/or back cushions of a seat), any other structure used to support and/or cushion any part or all of the body of a human or animal. However, absent description herein to the contrary, any or all of the features described in connection with the mattress or cushion can be applied to any other type of support surface having any other shape and size where cushioning is desired.

A process of manufacturing the convoluted foam layer in accordance with the present disclosure generally includes laminating multiple layers to form a foam laminate and introducing the foam laminate having a longitudinal dimension between a pair of counter rotating drums, at least one of which has a convoluted surface. As the foam laminate is drawn between the drums, the convolutions present on the surface of at least one of the rotating drums compresses the foam laminate to a greater or lesser degree depending on the locations of the convolutions on the drum. A heated wire or blade is held generally parallel to and between the drums such that the foam laminate is cut generally mirroring the convolutions on the surface of the drum. That is, where a drum convolution compresses the foam laminate in the vicinity of the heated wire or blade, the wire or blade passes through the foam laminate at a point nearer to the foam surface which is in contact with the drum convolution. The convolution on the at least one drum has a height such that transference into the cut foam laminate extends from the outer layer to at least a portion of an abutting layer and forms two convoluted foam layers from the foam laminate.

The number of layers that can be used to form the laminate foam layer is not intended to be limited. In one embodiment, the number of layers is symmetrically disposed about a middle layer such that each successive pair of layers added to the structure are of the same material and/or have the same properties but differ from an abutting layer. In other embodiments, the laminated foam layer is asymmetric.

Figure 2:
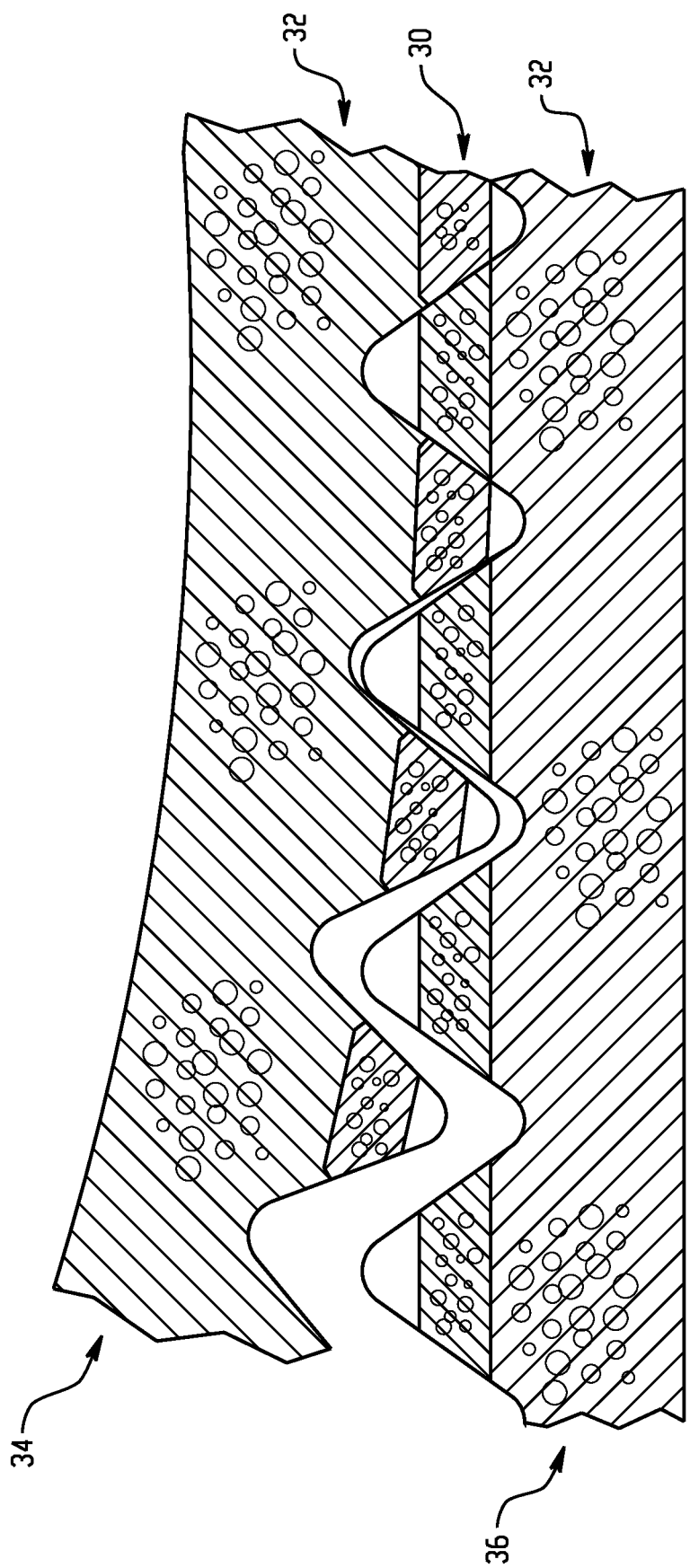
FIG. 2 is a cross sectional view of a convoluted foam layer in accordance with the present disclosure.

By of example, FIG. 2 provides a cross sectional view of a laminate foam layer including three layers, a middle layer 30 and outer layers 32, wherein the outer layers 32 are of the same material and/or have the same properties. Alternatively, the outer layers 32 are different foam materials or are foams having different properties to create three layers, wherein each layer provides different properties. The middle layer 30 is a different material and/or has different properties relative to the outer layers 32. As the foam laminate is cut, two convoluted foam layers 34, 36 are formed that are mirror images of one another and provide the convolutions with the same heterogeneous structure.

Figure 3:
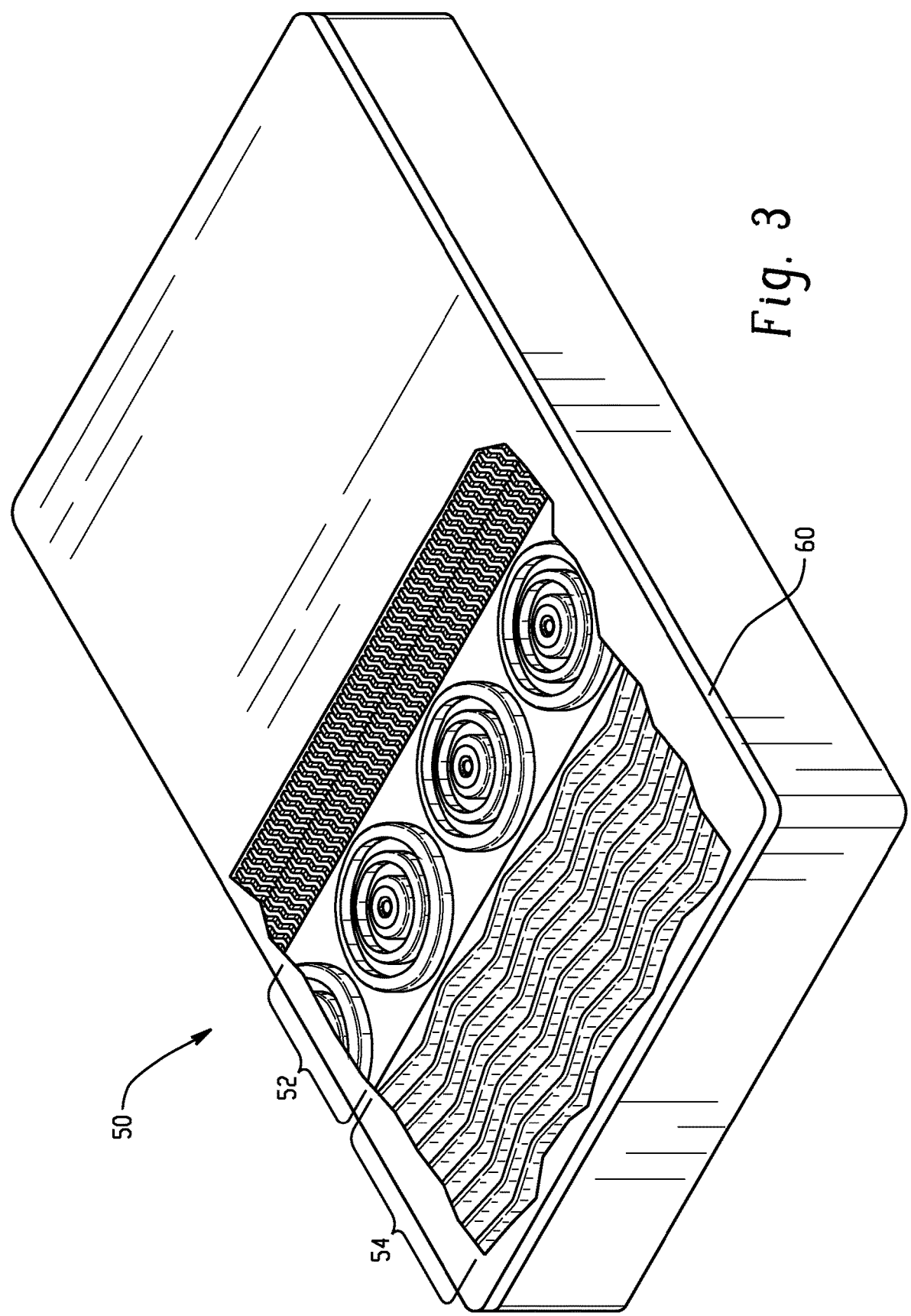
FIG. 3 is a partial; perspective view of a zoned convoluted foam layer in accordance with the present disclosure.
Figure 4:
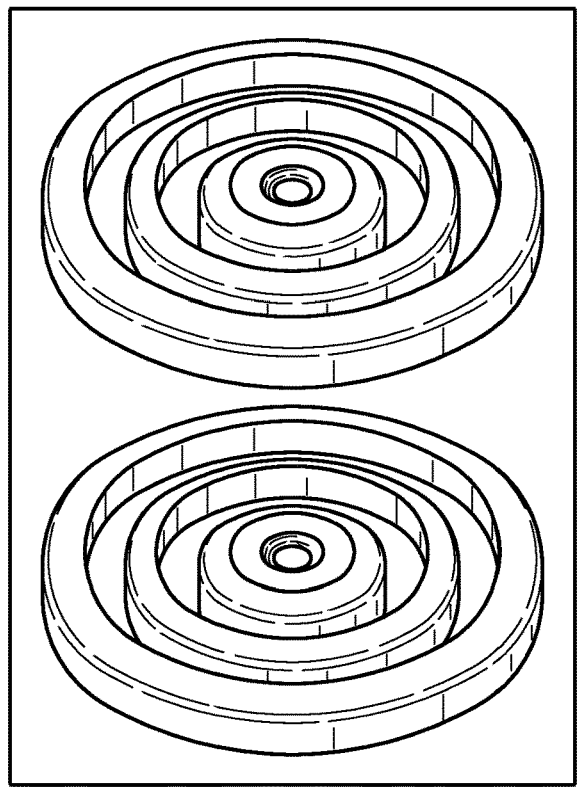
FIGS. 4-7 illustrate various exemplary convoluted surface patterns for the convoluted layer and multi-zoned mattress containing the same.
Figure 5:
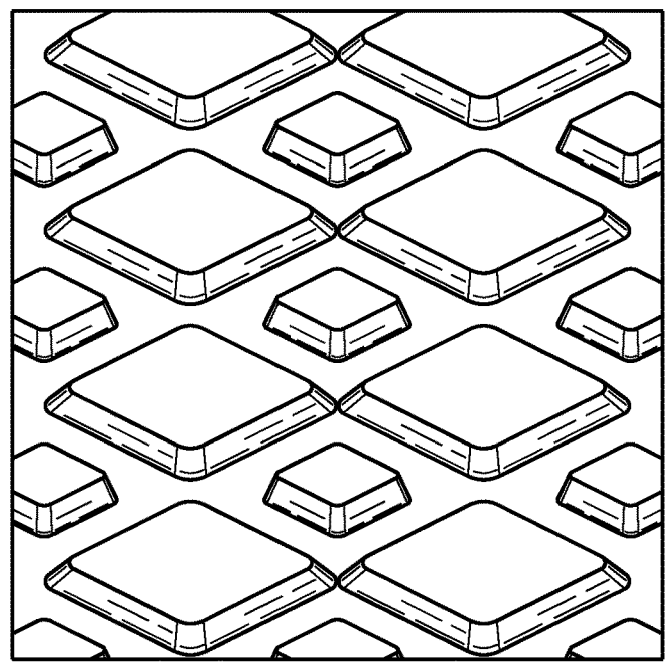
Figure 6:
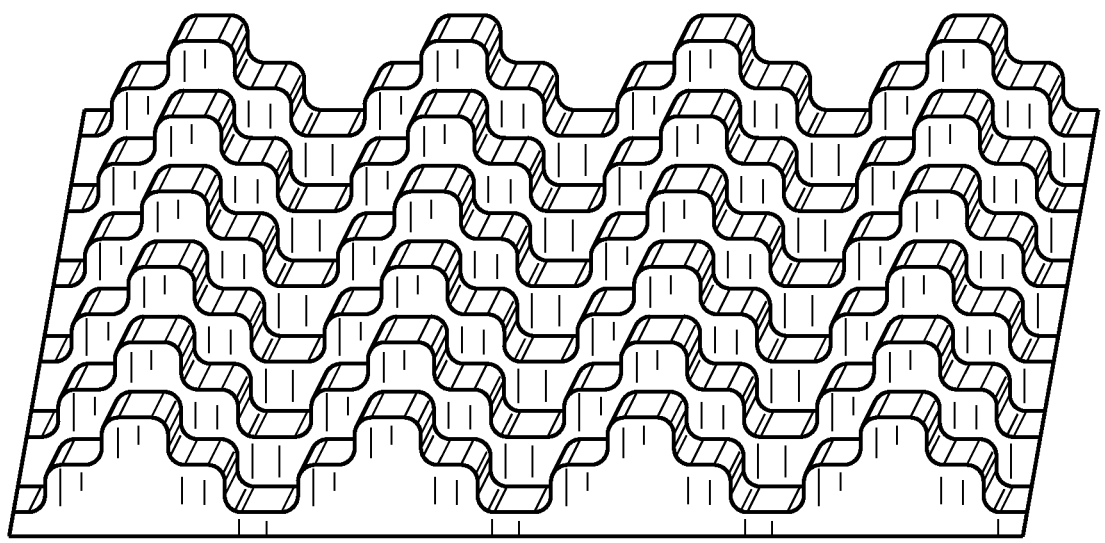
Figure 7:
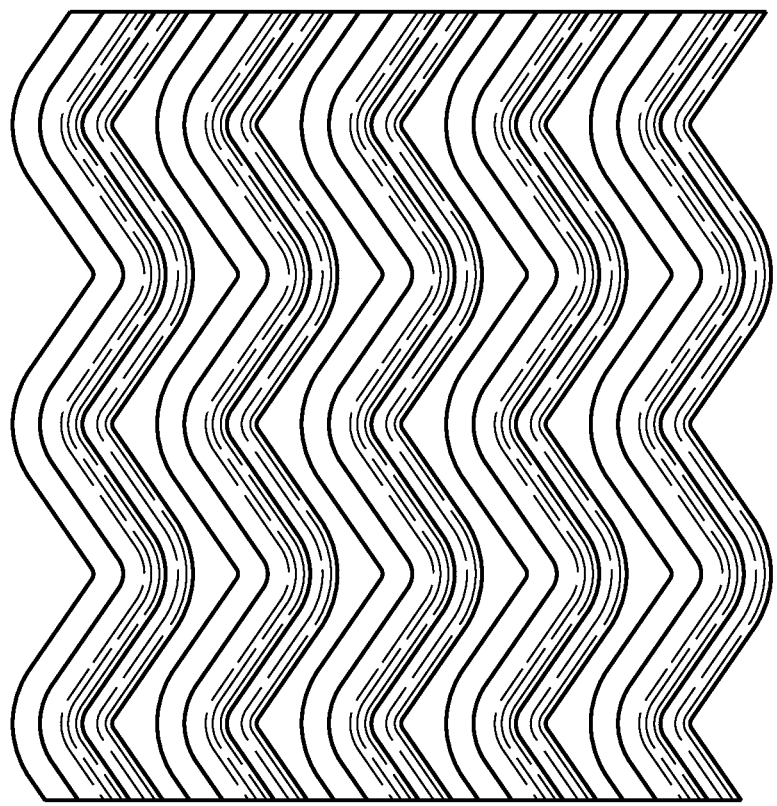

Turning now to FIG. 3, there is depicted a perspective sectional view of a convoluted foam layer 50 including multiple convoluted zones. The particular zones are not intended to be limited to any particular location nor are they limited to any particular shape. For example, the multiple zones may include a spherical pattern 52 corresponding to a lumbar region to simulate a massaging tactile feel another zone may include a wave pattern 54 corresponding to foot support zone so as to minimize pressure points thereon.

Optionally, one or more of the layers employed in the convoluted foam layer may be of a different color to provide the end user with a visual contrast between the different layers.

The number of zones is not intended to be limited. In one embodiment, the number of zones ranges from 2 to 20, and in other embodiments the number of zones ranges from 2 to 10, and in still other embodiments, the number of zones ranges from 3 to 7. The particular shape of the convolutions within a particular zone is generally not limited. Exemplary shapes are provided in FIG. 4-7, which depict circular pattern, a rhombus pattern, a fishbone pattern, and a wave pattern, respectively.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A convoluted foam layer comprising: a multi-layer foam laminate comprising a first layer, a second layer attached to the first layer, and at least one additional layer fixedly attached to the second layer and overlaying the second layer, wherein at least two of the first layer, the second layer and the at least one additional layer are of different materials, and wherein at least one of the first layer, the second layer, and the at least one additional layer is a viscoelastic layer, wherein each of the layers has a density within a range of 1 to 2.5 lb/ft$^3$ for non-viscoelastic foams and 1.5 to 6 lb/ft$^3$ for viscoelastic foams;

wherein the multi-layer foam laminate comprises a convoluted bottom surface and a convoluted foam top surface, wherein the convoluted top surface comprises a plurality of convolutions, wherein at least one of the convolutions has a depth extending from a peak to a valley into the first layer, the second layer, and the at least one additional layer, wherein the first layer and the at least one additional layer have different density properties relative to the second layer, and wherein the different density properties define a density gradient in the convolutions from the first layer to the at least one additional layer, and wherein the multi-layer foam laminate comprises multiple zones of the convoluted foam surface having different shapes.

2. The convoluted foam layer of claim 1, wherein a selected one of first layer or the at least one additional layer in the multi-layer foam laminate comprises a viscoelastic foam having the hardness from 7 to 16 pounds-force and the density ranging from 1.5 to 6 pounds per cubic foot, and a non-selected one is a non-viscoelastic foam.

3. The convoluted foam layer of claim 1, wherein a selected one of the first layer or the at least one additional layer in the multi-layer foam laminate comprises a non-viscoelastic foam having a hardness from 7 to 45 pounds force and a density ranging from about 1 to 2.5 pounds per cubic foot, and the other one is a different foam material.

4. The convoluted foam layer of claim 2, wherein the non-selected one is a foam material selected from the group consisting of polyurethane, latex, polystyrene, polyethylene, polypropylene, and gel infused foams.

5. A mattress comprising: at least one convoluted foam layer comprising a convoluted bottom surface and a convoluted foam top surface, wherein the convoluted top surface comprises a plurality of zones defined by a convoluted surface pattern, wherein the convoluted surface pattern comprises at least one convolution that is structurally heterogeneous comprising a first layer, a second layer attached to the first layer, and at least one additional layer attached to the second layer, wherein the first layer, the second layer, and the at least one additional layer are of different foam materials and at least one of the first layer, the second layer, and the at least one additional layer is a viscoelastic layer, the first layer and the at least one additional layer have different density properties relative to the second layer and define a density gradient in the convolutions from the first layer to the at least one additional layer, and wherein the at least on convoluted foam layer comprises multiple zones having different shapes, wherein each of the layers has a density within the range of 1 to 2.5 lb/ft$^3$ for non-viscoelastic foams and 1.5 to 6 lb/ft$^3$ for viscoelastic foams.

6. The mattress of claim 5, wherein the convoluted surface pattern comprises a wave pattern, fishbone pattern, a rhombus pattern, or a circular pattern.

* * * * *